United States Patent
Rook

(10) Patent No.: US 9,975,376 B2
(45) Date of Patent: May 22, 2018

(54) AXLE DAMPER INSERT

(71) Applicant: Goodrich Corporation, Charlotte, NC (US)

(72) Inventor: Todd Rook, Tipp City, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 122 days.

(21) Appl. No.: 14/976,974

(22) Filed: Dec. 21, 2015

(65) Prior Publication Data
US 2017/0174332 A1 Jun. 22, 2017

(51) Int. Cl.
| | |
|---|---|
| *B60B 35/08* | (2006.01) |
| *B64C 25/36* | (2006.01) |
| *B64C 25/58* | (2006.01) |
| *B64C 25/42* | (2006.01) |
| *F16F 7/10* | (2006.01) |
| *F16C 3/02* | (2006.01) |
| *B60B 35/04* | (2006.01) |
| *F16F 15/14* | (2006.01) |

(52) U.S. Cl.
CPC .............. *B60B 35/08* (2013.01); *B64C 25/36* (2013.01); *B64C 25/42* (2013.01); *B64C 25/58* (2013.01); *B60B 35/04* (2013.01); *B60B 2360/10* (2013.01); *B60B 2360/70* (2013.01); *B60B 2900/131* (2013.01); *F16C 3/02* (2013.01); *F16F 7/10* (2013.01); *F16F 15/1442* (2013.01)

(58) Field of Classification Search
CPC ......... B60B 35/02; B60B 35/08; B64C 25/36; B64C 25/42; B64C 25/58; F16C 3/02; B60K 17/22; F16F 15/02; F16F 15/12; F16F 15/14; F16F 15/145; F16F 15/322; F16F 7/10
See application file for complete search history.

(56) References Cited

U.S. PATENT DOCUMENTS

| | | | | |
|---|---|---|---|---|
| 2,001,166 | A * | 5/1935 | Swennes | F16F 15/10 295/36.1 |
| 5,326,324 | A * | 7/1994 | Hamada | F16F 15/1442 464/180 |
| 6,312,340 | B1 | 11/2001 | Gassen | |
| 6,439,359 | B1 * | 8/2002 | Kato | B60G 13/16 188/379 |

(Continued)

FOREIGN PATENT DOCUMENTS

| | | | |
|---|---|---|---|
| CN | 101725656 A | * | 6/2010 |
| DE | 1181560 | | 11/1964 |

(Continued)

OTHER PUBLICATIONS

EP Search report dated Aug. 8, 2017 in EP Application No. 16205280.7.

*Primary Examiner* — Kip T Kotter
(74) *Attorney, Agent, or Firm* — Snell & Wilmer L.L.P.

(57) ABSTRACT

Systems and methods are disclosed for aircraft wheels and brakes systems for use in, for example, an aircraft. In this regard, a damper for an axle may comprise a cylindrical canister defining a cavity configured to be inserted into a bore of the axle, the cavity at least partially filled with a damping material. The damper may act as a particle damper or a tuned mass damper to mitigate harmonic vibration of the axle and therefore the wheel and brake system.

19 Claims, 3 Drawing Sheets

(56) References Cited

U.S. PATENT DOCUMENTS

| | | | |
|---|---|---|---|
| 6,702,076 B2 * | 3/2004 | Koleda | F16F 15/10 |
| | | | 188/378 |
| 6,708,577 B2 * | 3/2004 | Pizzoni | F16H 25/2204 |
| | | | 74/424.81 |
| 6,874,228 B2 | 4/2005 | Armitage | |
| 7,083,523 B2 | 8/2006 | Haile | |
| 7,533,756 B2 | 5/2009 | Patrascu | |
| 8,261,896 B2 | 9/2012 | Boyd | |
| 8,528,180 B2 | 9/2013 | Sun | |
| 8,863,390 B1 | 10/2014 | Ley | |
| 9,340,269 B2 * | 5/2016 | Argento | B63H 23/36 |
| 2003/0176224 A1 * | 9/2003 | Armitage | B60K 17/22 |
| | | | 464/180 |
| 2007/0271790 A1 * | 11/2007 | Bingham | B64C 25/36 |
| | | | 29/894 |
| 2011/0159972 A1 | 6/2011 | Ikeda | |
| 2011/0247908 A1 | 10/2011 | Takko | |

FOREIGN PATENT DOCUMENTS

| | | | | |
|---|---|---|---|---|
| DE | 3632418 | | 3/1988 | |
| GB | 1462170 A | * | 1/1977 | B60K 17/22 |
| JP | 2010090966 A | * | 4/2010 | F16C 3/02 |

\* cited by examiner

AXLE DAMPER INSERT

FIELD

The present disclosure relates generally to the field of vibration damping, and more specifically to systems and methods for axle vibration damping.

BACKGROUND

Conventional aircraft wheel and brake assemblies comprise rotating and stationary components. During braking, vibration, including harmonic vibration, of a wheel and brake assembly, including an axle assembly, may occur. Brake vibration can result in damaged aircraft components if not properly managed.

SUMMARY

Systems disclosed herein may be useful for vibration damping of aircraft wheels, axle, and brakes systems. In this regard, a damper for an axle may comprise: a cylindrical canister defining a cavity configured to be inserted into a bore of the axle, a volume of the cavity between 50% and 100% filled with a damping material.

In various embodiments, the damper may be configured to be press fit into a bore of the axle. The damping material may comprise a high temperature particulate. The cylindrical canister may comprise at least one of a high temperature metal alloy, carbon/carbon composite, or ceramic composite. The damper may be at least one of a particle damper or a tuned mass damper. An outside diameter (OD) surface of the damper may be configured to be radially retained by an inside diameter (ID) surface of the axle. The damping material may be configured to react to a movement of the axle.

An axle assembly may comprise: an axle and a damper comprising a cylindrical canister defining a cavity configured to be inserted into a bore of the axle, the cavity at least partially filled with a damping material. The damping material may comprise a high temperature particulate. The axle assembly may further comprise an axle nut coupled to the axle, the axle nut configured to axially retain a wheel to the axle. The axle nut may be configured to axially retain the cylindrical canister. The damper may be configured to be press fit into a bore of the axle. The cylindrical canister may comprise at least one of a high temperature metal alloy, carbon/carbon composite, or ceramic composite. The damper may be at least one of a particle damper or a tuned mass damper. An outside diameter (OD) surface of the damper may be configured to be radially retained by an inside diameter (ID) surface of the axle.

A damper for an aircraft axle may comprise: a cylindrical canister defining a cavity configured to be inserted into the aircraft axle, the cavity at least partially filled with a damping material comprising a particulate, the cylindrical canister comprising an outside diameter (OD) surface configured to be radially retained by an inside diameter (ID) surface of the aircraft axle.

In various embodiments, a length of the damper may be between 100% and 1000% of a diameter of the damper. A length of the damper may be between 5% and 25% of a length of the aircraft axle. A thickness of the damper may be between 0.1% and 25% of a thickness of the aircraft axle. Between 50% and 99% of a volume of the cavity may be occupied by the damping material and a remaining volume may be occupied by at least one of air or nitrogen.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the context of the present disclosure, methods may find particular use in connection with aircraft wheel and brake systems. However, various aspects of the disclosed embodiments may be adapted for optimized performance with a variety of components and in a variety of systems. As such, numerous applications of the present disclosure may be realized.

In various embodiments, a damper may comprise a canister filled with a damping material. The damper may be inserted into an axle to help mitigate vibration of the axle, axle assembly, and adjacent components such as the wheel and brake assembly, for example. In various embodiments, a damper may function as a tuned mass damper or a particle damper wherein the damping material inside of the canister reacts with the movement of the axle to absorb energy and add dampening to a resonance of the vibration.

Figure 1:
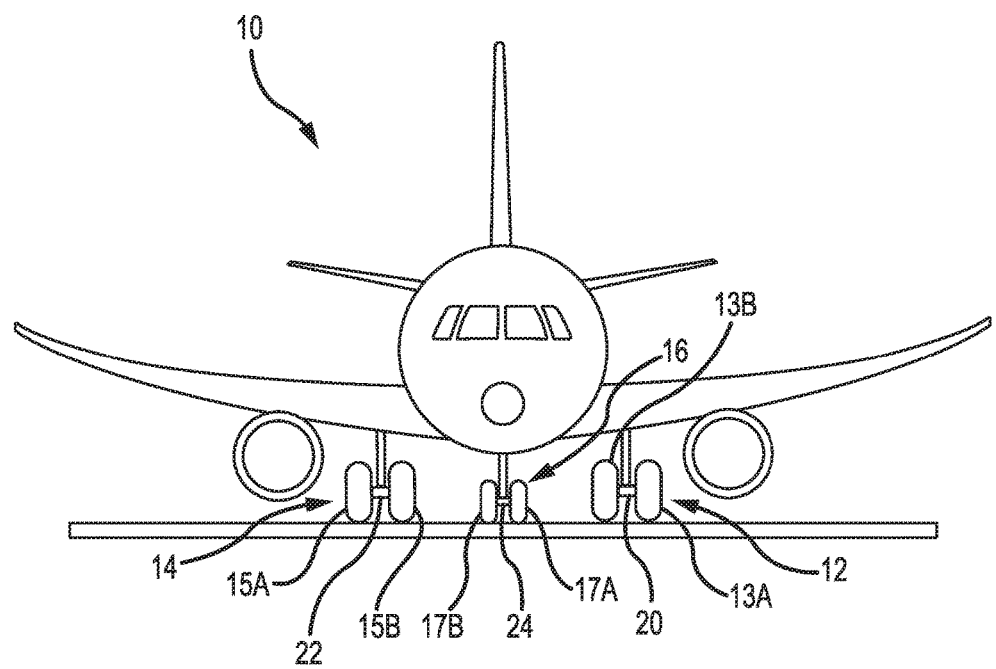
FIG. 1 illustrates an aircraft having landing gear, in accordance with various embodiments.
Figure 1:
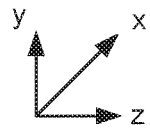

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include wheel 13A and wheel 13B coupled by an axle 20. Landing gear 14 may include wheel 15A and wheel 15B coupled by an axle 22. Landing gear 16 may include nose wheel 17A and nose wheel 17B coupled by an axle 24. The nose wheels differ from the main wheels in that the nose wheels may not include a brake and/or a wheel speed transducer. An xyz axes is used throughout the drawings to illustrate the axial (z), radial (y) and circumferential (x) directions relative to axle 22.

Figure 2:
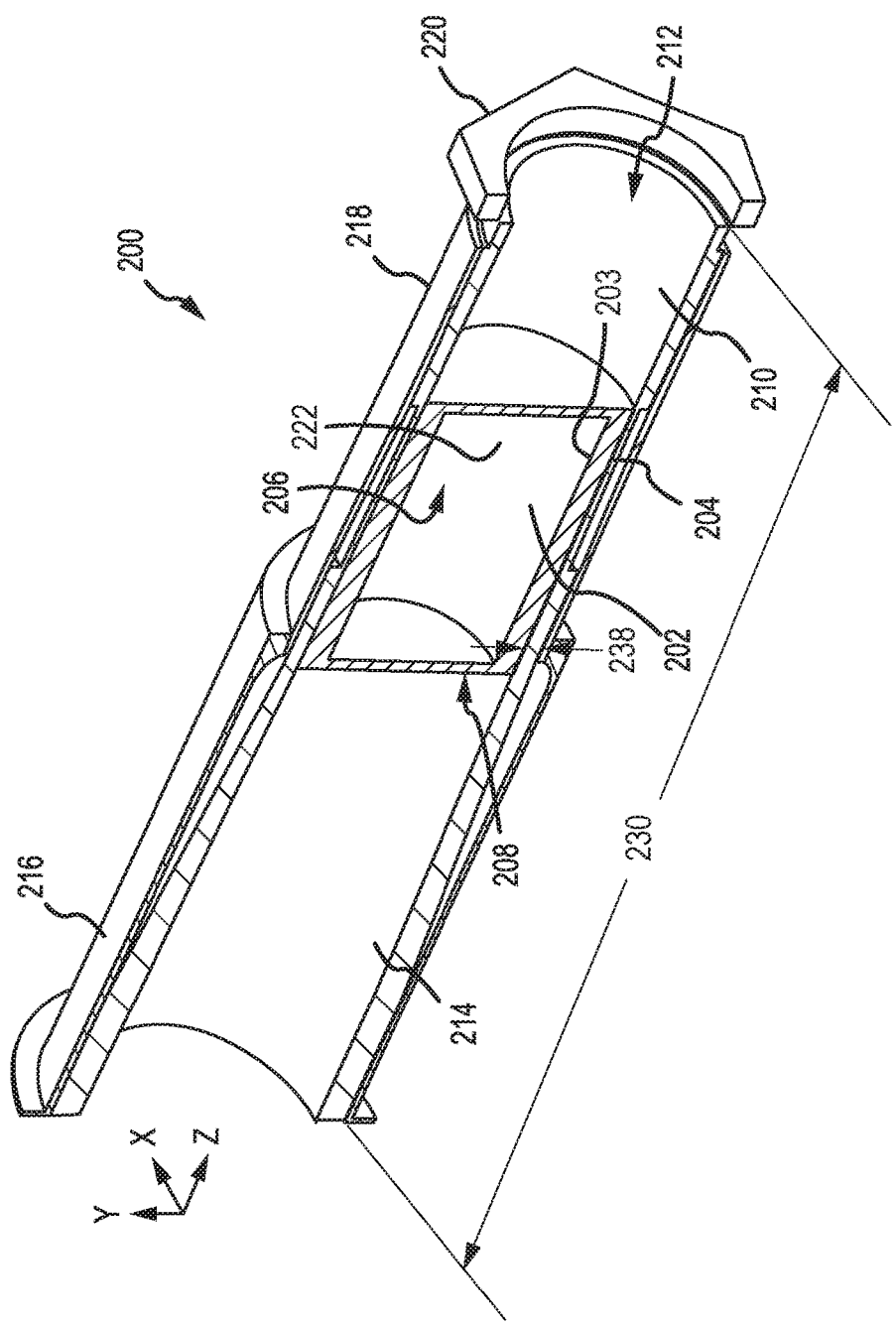
FIG. 2 illustrates a partial cross-section view of an aircraft axle assembly with a damper, in accordance with various embodiments.

With reference now to FIG. 2, a partial cross-section view of axle assembly 200 is illustrated. In various embodiments, axle assembly 200 may include axle 210, damper 202, first sleeve (also referred to herein as a brake axle sleeve) 216, second sleeve (also referred to herein as wheel axle sleeve) 218, and/or nut (also referred to herein as axle nut) 220. In various embodiments, axle 210 may be similar to axle 22 (see FIG. 1). Brake axle sleeve 216 may circumferentially surround at least a portion of axle 210. Brake axle sleeve 216 may be configured to be coupled to a brake system. Wheel axle sleeve 218 may circumferentially surround at least a portion of axle 210. Wheel axle sleeve 218 may be configured to be coupled to a wheel. In various embodiments, axle nut 220 may be coupled to axle 210. In various embodiments, axle nut 220 may axially (z-direction) retain wheel axle sleeve 218 to the axle 210. In various embodiments, axle nut 220 may axially (z-direction) retain damper 202 within the axle 210. In various embodiments, axle nut 220 may axially (z-direction) retain a wheel, such as wheel 15B (see FIG. 1) for example, coupled to axle 210. Axle 210 may be configured to rotate about a center axis with a wheel, such as wheel 15B (see FIG. 1) for example.

Axle 210 may comprise a bore 212. Damper 202 may be located inside of bore 212. Axle 210 may comprise an inside diameter (ID) surface 214. Damper 202 may comprise an ID surface 203. Damper 202 may comprise an outside diameter (OD) surface 204. OD surface 204 may be radially retained by ID surface 214. In various embodiments, damper 202 may be press-fit into axle 210.

Damper 202 may comprise a cylindrical canister 208. Cylindrical canister 208 may define a cavity 206. In this regard, cavity 206 may be at least partially defined by ID surface 203. Damper 202 may be at least partially filled with a damping material (material) 222.

Figure 4:
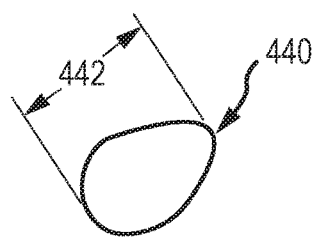
FIG. 4 illustrates a particle of a damping material, in accordance with various embodiments.

With further reference to FIG. 4, material 222 may comprise a plurality of particles such as particle 440. In various embodiments, material 222 may comprise a powder. In various embodiments, material 222 may comprise at least one of a particulate or high temperature granule. A high temperature granule may be a granule which is stable at high temperatures. Stated another way, a high temperature granule may be a granule configured to withstand high temperatures or maintain its physical and/or chemical state at high temperatures. In various embodiments, material 222 may comprise silica, silicon carbide, or any other suitable high temperature particulate. In various embodiments, material 222 may comprise sand. Material 222 may comprise a high surface area material. Accordingly, material 222 may comprise a plurality of small diameter particles 440, such as silicon carbide for example, comprising a high surface area. Although particle 440 may not be perfectly round, particle 440 may comprise a dimension 442 measured across its longest dimension. In various embodiments, dimension 442 may be between 1 micrometer and 100 millimeters (mm). In various embodiments, dimension 442 may be between 0.1 mm and 10 mm. In various embodiments, dimension 442 may be between 0.1 mm and 5 mm.

In various embodiments, material 222 may comprise a uniformity index (UI) defined by the ratio between larger and smaller particles of material 222 multiplied by 100. For example, a product whose UI is 50 means that the average small particle is half the size of the average large particle. In various embodiments, material 222 may comprise a UI of between 25 and 100. In various embodiments, material 222 may comprise a UI of between 50 and 80. In various embodiments, material 222 may comprise a UI of between 70 and 80. Furthermore, material 222 may comprise a low particle size distribution. For example, material 222 may be filtered to only include particles having a diameter within a pre-determined threshold.

With reference to FIG. 2, cavity 206 may comprise a volume. In various embodiments, damper 202 may be filled with material 222 such that material 222 occupies between 50% and 100% of the volume of cavity 206. In various embodiments, material 222 may occupy between 75% and 99% of the volume of cavity 206. In various embodiments, material 222 may occupy between 80% and 99% of the volume of cavity 206. In various embodiments, material 222 may be packed into damper 202 such that material 222 does not freely move inside of cavity 206. In various embodiments, the remaining volume not occupied by material 222 may be filled with air. In various embodiments, the remaining volume not occupied by material 222 may be filled with nitrogen.

In various embodiments, material 222 may be configured to react to movement of axle 210. For example, axle 210 may move radially in the negative y-direction and in response, material 222 may collide with damper 202, causing a reaction force and applying a force to axle 210 in the positive y-direction. Accordingly, in accordance with various embodiments, damper 202, along with material 222, may comprise a particle damper. A particle damper may be defined as a damper that uses particles moving freely in a cavity to produce a damping effect. Furthermore, in various embodiments, a particle damper may be defined as a damper wherein the particles are compacted with a preload (e.g. by a spring). In accordance with various embodiments, damper 202 along with material 222 may comprise a tuned mass damper. Accordingly, damper 202 may reduce the vibration of axle 210. Damper 202 may reduce or mitigate harmonic vibration of axle 210.

Figure 3:
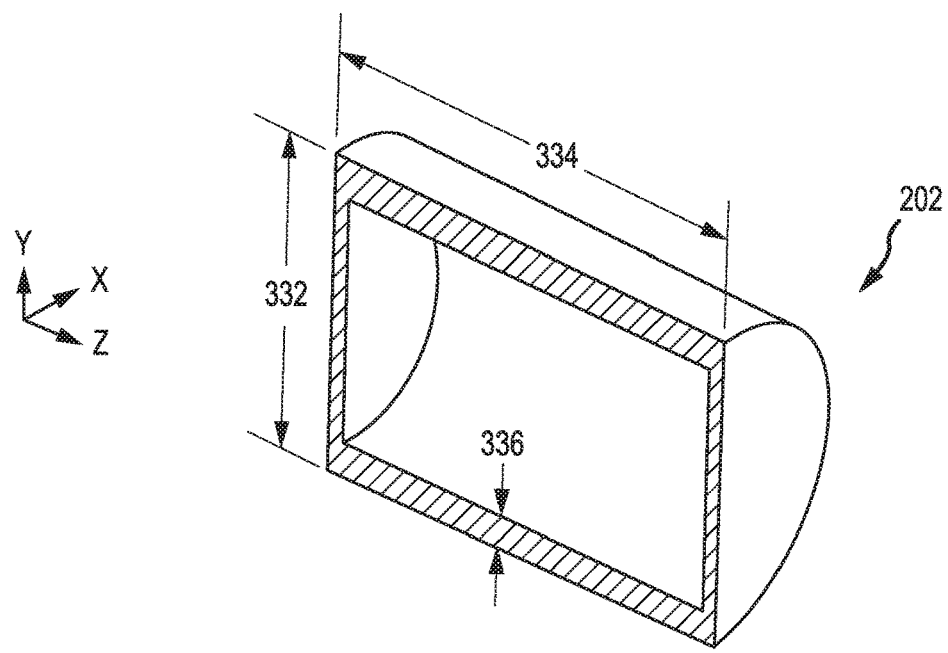
FIG. 3 illustrates a cross-section view of a damper, in accordance with various embodiments.

With reference to FIG. 3, a cross-section view of damper 202 is illustrated. An xyz-axes is provided for ease of illustration. In various embodiments, damper 202 may comprise a high temperature metal alloy, carbon/carbon composite, ceramic composite, or any other suitable high temperature material for containing material 222. Damper 202 may comprise a length 334, a diameter 332, and/or a thickness 336. In various embodiments, length 334 may be between 100% and 1000% of diameter 332. In various embodiments, length 334 may be between 200% and 800% of diameter 332. In various embodiments, length 334 may be between 300% and 500% of diameter 332.

With reference to FIG. 2 and FIG. 3, in various embodiments, axle 210 may comprise a length 230 measured along an axial direction (z-direction). In various embodiments, length 334 may be between 2% and 50% of length 230. In various embodiments, length 334 may be between 5% and 25% of length 230. In various embodiments, length 334 may be between 10% and 20% of length 230. Axle 210 may comprise a thickness 238. In various embodiments, thickness 336 may be between 0.1% and 25% of thickness 238. In various embodiments, thickness 336 may be between 1% and 15% of thickness 238. In various embodiments, thickness 336 may be between 1% and 10% of thickness 238.

With reference to FIG. 2, various instruments, such as a wheel speed sensor or cooling equipment for example, may be located inside of bore 212 adjacent to (in the positive z-direction) damper 202. It is contemplated herein that such instruments may be coupled to damper 202. In various embodiments, such instruments may axially retain damper 202. For example, a wheel speed sensor may be attached to damper 202 and may prevent damper 202 from sliding axially (z-direction) within axle 210. Furthermore, it is contemplated that damper 202 may provide similar retention for such instruments. For example, damper 202 may be attached to such instruments and may prevent such instruments from moving axially (z-direction) within bore 212.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A damper for an axle comprising:
   a cylindrical canister defining a cavity configured to be inserted into a bore of the axle, a volume of the cavity between 50% and 100% filled with a damping material that is separate from the cylindrical canister,
   wherein the cylindrical canister comprises:
     an outside diameter (OD) surface; and
     an inside diameter (ID) surface;
   wherein a thickness of the cylindrical canister is defined between the OD surface and the ID surface,
   the cavity is at least partially defined by the ID surface, and
   the OD surface of the cylindrical canister is configured to mechanically engage an inner diameter surface of the axle.

2. The damper for an axle of claim 1, wherein the damper is configured to be press fit into the bore of the axle.

3. The damper for an axle of claim 1, wherein the damping material comprises a high temperature particulate.

4. The damper for an axle of claim 1, wherein the cylindrical canister comprises at least one of a high temperature metal alloy, carbon/carbon composite, or ceramic composite.

5. The damper for an axle of claim 1, wherein the damper is at least one of a particle damper or a tuned mass damper.

6. The damper for an axle of claim 1, wherein the OD surface of the cylindrical canister is configured to be radially retained by the inner diameter surface of the axle.

7. The damper for an axle of claim 1, wherein the damping material is configured to react to a movement of the axle.

8. An axle assembly comprising:
   an axle; and
   a damper comprising a cylindrical canister defining a cavity configured to be inserted into a bore of the axle, the cavity at least partially filled with a damping material that is separate from the cylindrical canister,
   wherein the cylindrical canister comprises:
     an outside diameter (OD) surface; and
     an inside diameter (ID) surface;
   wherein a thickness of the cylindrical canister is defined between the OD surface and the ID surface,
   the cavity is at least partially defined by the ID surface, and
   the OD surface of the cylindrical canister mechanically engages an inner diameter surface of the axle.

9. The axle assembly of claim 8, wherein the damping material comprises a high temperature particulate.

10. The axle assembly of claim 8, further comprising an axle nut coupled to the axle, the axle nut configured to axially retain a wheel to the axle.

11. The axle assembly of claim 8, wherein the damper is configured to be press fit into the bore of the axle.

12. The axle assembly of claim 8, wherein the cylindrical canister comprises at least one of a high temperature metal alloy, carbon/carbon composite, or ceramic composite.

13. The axle assembly of claim 8, wherein the damper is at least one of a particle damper or a tuned mass damper.

14. The axle assembly of claim 8, wherein the OD surface of the cylindrical canister is configured to be radially retained by the inner diameter surface of the axle.

15. A damper for an aircraft axle comprising:
   a cylindrical canister defining a cavity configured to be inserted into the aircraft axle, the cavity at least partially filled with a damping material that is separate from the cylindrical canister comprising a particulate, wherein the cylindrical canister comprises:
   an outside diameter (OD) surface; and
   an inside diameter (ID) surface;

wherein a thickness of the cylindrical canister is defined between the OD surface and the ID surface, the cavity is at least partially defined by the ID surface, and the OD surface configured to be radially retained by an inner diameter surface of the aircraft axle in response to the OD surface mechanically engaging the inner diameter surface of the aircraft axle.

16. The damper for an aircraft axle of claim 15, wherein a length of the damper is between 100% and 1000% of a diameter of the damper.

17. The damper for an aircraft axle of claim 15, wherein a length of the damper is between 5% and 25% of a length of the aircraft axle.

18. The damper for an aircraft axle of claim 15, wherein the thickness of the damper is between 0.1% and 25% of a thickness of the aircraft axle.

19. The damper for an aircraft axle of claim 15, wherein between 50% and 99% of a volume of the cavity is occupied by the damping material and a remaining volume is occupied by at least one of air or nitrogen.

* * * * *